United States Patent [19]

Coulson et al.

[11] Patent Number: 4,503,501

[45] Date of Patent: * Mar. 5, 1985

[54] ADAPTIVE DOMAIN PARTITIONING OF CACHE MEMORY SPACE

[75] Inventors: Richard L. Coulson, Stanford, Calif.; Ronald L. Blickenstaff, Boulder, Colo.; P. David Dodd, Boulder, Colo.; Robert J. Moreno, Boulder, Colo.; Dean P. Kinard, Longmont, Colo.

[73] Assignee: Storage Technology Corporation, Louisville, Colo.

[*] Notice: The portion of the term of this patent subsequent to Feb. 7, 2001 has been disclaimed.

[21] Appl. No.: 441,791

[22] Filed: Nov. 15, 1982

Related U.S. Application Data

[63] Continuation-in-part of Ser. No. 325,351, Nov. 27, 1981, Pat. No. 4,430,712.

[51] Int. Cl.$^3$ .............................................. G06F 13/00
[52] U.S. Cl. .................................... 364/300; 364/200
[58] Field of Search ... 364/200 MS File, 900 MS File, 364/300; 365/77, 189

[56] References Cited

U.S. PATENT DOCUMENTS

| | | | |
|---|---|---|---|
| 3,142,043 | 7/1964 | Schrimpf | 364/200 |
| 3,585,600 | 6/1971 | Saltini | 364/200 |
| 3,906,455 | 9/1975 | Houston et al. | 365/77 |
| 3,976,977 | 8/1976 | Porter | 364/200 |
| 4,028,668 | 6/1977 | Riikonen | 364/200 |
| 4,035,778 | 7/1977 | Ghanem | 364/200 |
| 4,047,243 | 9/1977 | Dijkstra | 364/200 |
| 4,080,651 | 3/1978 | Cronshaw et al. | 364/200 |
| 4,096,567 | 6/1978 | Millard et al. | 364/200 |
| 4,115,854 | 9/1978 | Capowski et al. | 364/200 |
| 4,161,024 | 7/1979 | Joyce et al. | 364/200 |
| 4,195,342 | 3/1980 | Joyce et al. | 364/200 |
| 4,219,883 | 8/1980 | Kobayashi et al. | 365/189 |
| 4,315,312 | 2/1982 | Schmidt | 364/200 |

Primary Examiner—Raulfe B. Zache
Assistant Examiner—William G. Niessen
Attorney, Agent, or Firm—Woodcock Washburn Kurtz Mackiewicz & Norris

[57] ABSTRACT

A method of operation of a memory array for storage of records of differing predetermined sizes is disclosed which features division of the array into domains which are substantially integral multiples of the predetermined record sizes. In a preferred embodiment the domain allocation may be varied adaptively in accordance with usage so as to enable more efficient use of the array.

8 Claims, 7 Drawing Figures

8650 – 19,069 × 13

| FR1 | FR2 | FR3 | FR4 | FR5 | FR6 | FR7 |
|---|---|---|---|---|---|---|
| FR7 | FR8 | FR9 | FR10 | FR11 | FR12 | FR13 | a

8375 – 37,000 × 6

| FR1 | FR2 | FR3 |
|---|---|---|
| FR4 | FR5 | FR6 | b

8380 – 47,476 × 5

| FR1 | FR2 | FR3 |
|---|---|---|
| FR3 | FR4 | FR5 | c

Fig. 2

| DOMAINS ALLOCATED TO DEVICE TYPE A | "A USE" | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | A | B | C | D | E | F |
| 0 | n | n | a | a | a | a | a | a | a | a | a | a | a | a | a | a |
| 1 | b | n | n | a | a | a | a | a | a | a | a | a | a | a | a | a |
| 2 | b | n | n | a | a | a | a | a | a | a | a | a | a | a | a | a |
| 3 | b | b | n | n | a | a | a | a | a | a | a | a | a | a | a | a |
| 4 | b | b | b | n | n | a | a | a | a | a | a | a | a | a | a | a |
| 5 | b | b | b | b | n | n | a | a | a | a | a | a | a | a | a | a |
| 6 | b | b | b | b | n | n | n | a | a | a | a | a | a | a | a | a |
| 7 | b | b | b | b | b | b | n | n | a | a | a | a | a | a | a | a |
| 8 | b | b | b | b | b | b | n | n | n | a | a | a | a | a | a | a |
| 9 | b | b | b | b | b | b | b | n | n | n | a | a | a | a | a | a |
| A | b | b | b | b | b | b | b | b | n | n | n | a | a | a | a | a |
| B | b | b | b | b | b | b | b | b | b | n | n | n | a | a | a | a |
| C | b | b | b | b | b | b | b | b | b | b | n | n | n | a | a | a |
| D | b | b | b | b | b | b | b | b | b | b | b | n | n | n | a | a |
| E | b | b | b | b | b | b | b | b | b | b | b | b | n | n | a | a |
| F | b | b | b | b | b | b | b | b | b | b | b | b | b | n | n | n |

Fig. 3

| REL ADDR | DESCRIPTION |
|---|---|
| 0000 | TOP OF LRU LIST DEVICE TYPE A (DUMMY ENTRY) — 66 |
| ⋮ | ⋮ 68 |
| 000A | BOTTOM OF LRU LIST DEVICE TYPE A (DUMMY ENTRY) — 70 |
| 0014 | TOP OF LRU LIST DEVICE TYPE B (DUMMY ENTRY) |
| ⋮ | ⋮ 72 |
| 001E | BOTTOM OF LRU LIST DEVICE TYPE B (DUMMY ENTRY) |
| 0028 | FRAME DESCRIPTOR 1 (SEE DESCRIPTION BELOW) |
| 0032 | FRAME DESCRIPTOR 2 |
| 74 | ⋮ |
| XXXX | FRAME DESCRIPTOR N (N DEPENDS ON CONFIGURATION) |
| XXXX | END OF TABLE INDICATOR |

Fig. 5A

FRAME DESCRIPTOR:

| REL ADDR | BYTE 0 | BYTE 1 |
|---|---|---|
| 00 | HASH COLLISION FWD (HI) | HASH COLLISION FWD (LO) |
| 01 | HASH COLLISION BAK (HI) | HASH COLLISION BAK (LO) |
| 02 | LRU LIST FWD (HI) | LRU LIST FWD (LO) |
| 03 | LRU LIST BAK (HI) | LRU LIST BAK (LO) |
| 04 | TRACK ADDRESS: DID | TRACK ADDRESS: CYL (HI) |
| 05 | TRACK ADDRESS: CYL (LO) | TRACK ADDRESS: HEAD |
| 06 | FRAME STATUS BYTE | FRAME ACCESS COUNT |
| 07 | DOMAIN NUMBER | CACHE ADDRESS: DOMAIN |
| 08 | CACHE ADDRESS: BOT (HI) | CACHE ADDRESS: BOT (LO) |
| 09 | ALGORITHM INFO BYTE 1 | ALGORITHM INFO BYTE 2 |

Fig. 5B

FRAME STATUS BYTE:

| BIT 0 | 1 = THIS FRAME IS ALLOCATED (CONTAINS VALID DATA) |
|---|---|
| BIT 1 | 1 = THIS FRAME BELONGS TO DEVICE TYPE A |
| BIT 2 | 1 = THIS FRAME IS DEFINED |
| BIT 3 | 1 = STAGE IN PROGRESS FOR THIS FRAME |
| BIT 4 | 1 = PERMANENT ERROR EXISTS ON THIS FRAME |
| BIT 5 | 1 = THIS FRAME IS CURRENTLY IN USE |
| BIT 6 | RESERVED |
| BIT 7 | RESERVED |

ADAPTIVE DOMAIN PARTITIONING OF CACHE MEMORY SPACE

CROSS-REFERENCE TO RELATED APPLICATIONS

This application is a continuation-in-part of copending Ser. No. 325,351, filed Nov. 27, 1981, now U.S. Pat. No. 4,430,712 issued Feb. 7, 1984, having the same title.

FIELD OF THE INVENTION

This invention relates to data storage management and control. More particularly, the invention relates to a system wherein a solid-state cache memory used in conjunction with long-term magnetic disk storage devices of varying types is subdivided into blocks or "domains" of sizes chosen so as to ensure efficient cache memory utilization despite varying demands placed on the system.

BACKGROUND OF THE INVENTION

The present invention relates to a solid-state cache memory subsystem designed to be used as an adjunct to long-term magnetic disk storage media. The cache memory is connected outboard of a conventional data transmission channel not specifically designed for use with such a cache memory subsystem, such that the cache memory system is plug-compatible with and software transparent to a host computer. In particular, the invention is designed to operate in accordance with the cache memory subsystem which is the subject matter of copending Ser. No. 325,346 filed Nov. 27, 1981, Dodd, "Cache Buffered Memory Subsystem", incorporated herein by reference. That application describes a cache memory subsystem which is operatively connected to storage director(s) which, in turn, are connected between a host computer at one terminus and the control modules at another. In turn the control modules connect to the actual disk drive. As is known in the art, the directors serve to interface the host with the control modules which, in turn, interface the directors to the disk drives. The control modules are selected in accordance with a particular type of disk drive used, while the directors may be used with various types of control modules and hence various types of disk drives. According to the invention of that application, the cache is adapted to be used with varying sorts of disk drives and control modules by virtue of direct connection to the director(s).

The function of the solid-state cache memory subsystem in the invention of the copending application referred to above is to store certain data which has been determined to be likely to be called for by the host in advance of an actual host request for the data. This determination is done in accordance with the invention disclosed in further copending applications, Ser. No. 325,350, filed Nov. 27, 1981, Coulson et al, "Detection of Sequential Data Streams", and in a continuation-in-part of that application, Ser. No. 441,901 filed Nov. 15, 1982, having the same title, both incorporated herein by reference. In a preferred embodiment of that invention, once it has been determined that a particular block of data is likely to be called for by the host, the entire disk "track" containing that block of data is brought into the cache memory for temporary storage in anticipation of its being called for by the host computer.

It is desirable for reasons of addressing convenience to subdivide the cache memory into "frames" which are sized to store blocks of data of the sizes which can be expected to be stored therein. Inasmuch as the cache memory subsystem must be adapted to cooperate with varying types of disk drives which in turn have varying amounts of data stored on a given track, means must be provided whereby the cache memory is as useful as is possible despite the fact that disk tracks of varying sizes will be stored therein track by track. For example, if it were assumed that the total cache memory was to contain 200 kilobytes (hereinafter 200 kb) of data, and the track length of a particular disk drive was 20 kb, 10 such tracks would fit into the cache. Stated slightly differently, the cache could be divided into ten 20-kb "frames." When, for example, all ten frames were full and it was desired to cache another track, a cache manager could then simply deallocate a frame, for example, the frame containing the data which had been least recently used and then allocate that frame to the new track. However, if data stored on another type of disk drive having a track size of, say, 25 kg, were desired to be staged, it would be necessary to deallocate two adjacent 20 kb frames in order to accommodate a 25 kb track thus wasting 15 kb of space. Even assuming two adjacent frames could be deallocated without loss of useful data, the waste of space alone would clearly be undesirable.

If, on the other hand, the entire solid-state memory were divided into two subportions or "domains" one adapted to store only tracks of one size, and another proportioned to store tracks of another size, the individual domains of the memory might be efficiently subdivided for allocation to tracks of a particular size. However, the utility of this solution presupposes that the relative activity of the disks having the two sizes of tracks is constant over time, which cannot be expected to be the case. Thus, it is desirable that all area of the solid-state memory be accessible to any track size supported by the cache in order that it can be most efficiently used. Finally, one could divide the cache memory into much smaller, uniformly-sized "pages", e.g., 2 kb, into which a track of any size could be divided. However, this would require complex hardware to implement and would additionally reduce the efficiency of the cache as an individual disk track would necessarily tend to be stored on varying portions of the cache, which would entail substantial additional support, e.g., recall of the numerous storage locations of the portions of a given track.

OBJECTS OF THE INVENTION

It is accordingly an object of the present invention to provide a means whereby the storage area available in a solid-state cache memory can be most efficiently used.

It is a further object of the invention to provide a means whereby a solid-state cache memory subsystem can be operated efficiently to store data records of varying sizes.

It is a further object of the invention to provide a means for "adaptively" or "dynamically" reconfiguring a cache memory previously divided into domains of plural classes in accordance with actual use, so as to fully utilize the memory space available.

SUMMARY OF THE INVENTION

The above needs of the art and objects of the invention are satisfied by the present invention according to which a solid-state memory is subdivided into domains.

The size of the domains is chosen to be a substantially integral multiple of each of the track sizes desired to be stored therein, such that, for example, three 50-kb tracks from one class of device will fit within the same 150-kb domain as two 75-kb tracks from another class. Each individual domain is thereafter assigned to storage of tracks from a given type of device, and then divided into track-sized frames, to which individual tracks are written. Statistics are maintained on domain usage. If the indications are that the data staged from a particular device type predominates over another, a given domain is reallocated from the second device type to the first device type so as to insure efficient usage of the total memory space available. In this way, fragmentation due to intermingling of varying track sizes in the same area of memory is avoided.

BRIEF DESCRIPTION OF THE DRAWINGS

The invention will be better understood if reference is made to the accompanying drawings, in which:

FIG. 2 shows how individual domains can be subdivided according to the track sizes desired to be stored therein;

FIG. 3 shows a domain switching decision table used in determining which domains to switch at a particular time;

FIGS. 5a-5c depict the least recently used (LRU) list used in assigning frames to data to be stored.

DESCRIPTION OF THE PREFERRED EMBODIMENTS

As discussed above, the adaptive domain partitioning methods of the invention are designed to be used in a solid-state cache memory subsystem operating to contain data being stored on disk memory in anticipation of its being called for by a host computer.

Figure 1:
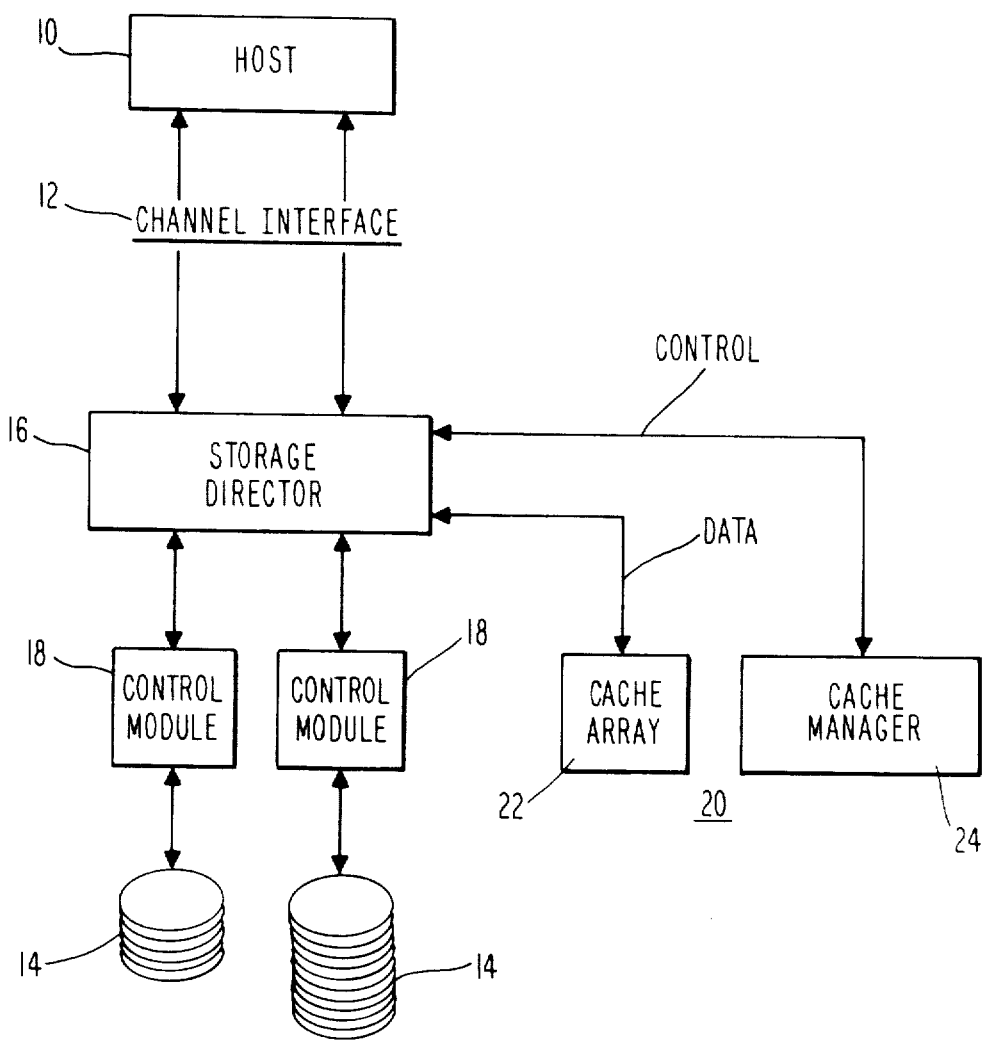
FIG. 1 represents a schematic block diagram view of the system of the invention.

FIG. 1 shows a schematic diagram of such a system. The host computer 10 is connected by means of a conventional channel interface 12 to a storage director 16. The storage director in turn interfaces to plural control modules 18 which themselves control disk drives 14 which as shown may be of differing types. In particular, the amount of data stored on a given track of one of the disks 14 can vary. When a decision is made by a cache manager 24, e.g., in accordance with the copending applications referred to above having the title "Detection of Sequential Data Stream", that it would be desirable to store the contents of a track in a solid-state cache memory array 22, a number of locations in the cache corresponding in size to the length of the track on the disk 14—i.e., a "frame" of locations in the cache—must be assigned to the data. Accordingly when it is desired by the cache manager 24 that a particular track be staged into a frame in the cache array 22, a frame of appropriate size is assigned to that track and the operation proceeds.

Those skilled in the art will recognize that such "framing" of a block of contiguous memory locations and assignment thereof is desirable to reduce the complexity of assigning addresses to the data. In particular, if this is done, the beginning-of-track (BOT) and the end-of-track (EOT) addresses only need to be known to fully define the locations of all the data on the track, as the total number of data bytes is defined by the frame definition. See copending Ser. No. 440,334 filed Nov. 9, 1982, Swiatek et al, "Dynamic Addressing for Variable Track Length Cache Memory", and Ser. No. 325,288, filed Nov. 27, 1981, Moreno et al for "Control of Cache Buffer for Memory Subsystem", and a continuation-in-part of that application Ser. No. 441,818 filed Nov. 15, 1982, having the same title, all of which are incorporated herein by reference, for details of assignment of cache memory addresses to data to be stored in the frames. The present invention is concerned with efficient division of the cache array into subportions or "domains." The size of the domains is chosen so that approximately integral numbers of disk tracks of varying lengths fit into "frames" in each domain. Thus, after allocation of the domain to a particular track length, it is divided into "frames" of sizes corresponding to the track lengths.

Data records from a track on a magnetic disk are stored in a frame in a cache memory which is described by two parameters, the beginning of track (BOT) address and an end of track (EOT) address. The addresses for BOT and EOT are stored in a register file where they are easily changed. BOT and EOT addresses can be varied at any time under program control. With these programmable frame boundaries, the addressing of frames in the cache becomes dynamically variable.

A microprocessor in the cache manager stores a list of addresses for frames in the cache memory at which tracks of disk from different types of magnetic disk units may be stored. These addresses include a beginning of track address from which an end of track address can be derived. These span a frame having enough memory locations to store an entire track for a particular type of disk unit. These addresses are supplied to a data and address assembler.

Records from a track of one of the disk units are stored in the frame specified by the beginning of track address and the end of track address. In accordance with the invention of copending Ser. No. 440,334 filed Nov. 9, 1982 and incorporated herein by reference, the records are stored in the order received. That is, records are stored sequentially, but the first record is not necessarily stored immediately after the EOT address. Upon thereafter reading these records, it is desired to read them out sequentially starting with the record at a specified starting address. In order to do this, beginning with the starting address each time a record is read, its address is incremented to form the next address. The incremented address is compared to the end of track address. When the end of track address is reached, the next address is set to the beginning of track address. In this manner, records are read from the cache memory in a manner which emulates the reading of records from the track of the disk unit.

It can be expected that at some point all the domains allocated to tracks of a particular length would be heavily in use, while those allocated to disk tracks of other type(s) were not. According to an important aspect of the present invention, the domains are chosen to all be of the same size so that they can be efficiently reallocated to contain data stored on a different type of disk memory device. The domains are "dynamically" repartitioned into frames of a different size according to usage. For this reason, the domain size is chosen such that the domains contain integral numbers of frames of various sizes. FIG. 2 shows an example of how this can be done. There the domain size is approximately 256 kilobytes (kb). In a preferred embodiment, the cache contains some 12 of such domains for a total capacity of approximately 3 megabytes. Three possible domain subdivision schemes are shown in FIG. 2.

FIG. 2a shows a scheme which might be adopted for a domain to be used with a model 8650 disk drive sold by Storage Technology Corporation, the assignee of the present invention, in which each track contains some 19,069 bytes plus some identifying "header" information. Thirteen such tracks with their headers will fit within the 256 kb domain. Storage Technology Corporation's Model 8375 disk drive has a track size of approximately 37,000 bytes. As shown in FIG. 2b, six such 37,000 kb tracks with headers will fit within the 256 kb domain. Finally, Storage Technology Corporation's Model 8380 disk drive has a 47,476 byte track size. FIG. 2c shows that five such frames together with headers fit well into the 256 kb domain size.

According to the present invention, dynamic repartitioning of cache space allocation is provided in accordance with usage. This allows high storage efficiency without severe fragmentation. Fragmentation is wastage of space due to lack of correspondence between the size of available frames and the sizes of the tracks that are to be stored in the available frames. Severe fragmentation is avoided because a domain may be reallocated from one device type to another by reframing whenever desirable. Reallocation occurs in only one domain at a time, thus providing stability and simplicity by eliminating the need to invalidate the entire cache allocation scheme at anytime. A "domain use count" is kept to keep track of which class of domains are experiencing heavy usage. This makes it possible to determine whether the current allocation of the domains is the most efficient with respect to usage of the system at any particular time. This is discussed below in connection with FIGS. 3 and 4.

A preliminary problem which must be addressed is frame assignment, that is, picking the best frame to assign to a given track to be staged to the cache array. The "best frame" is one which is not currently allocated to any track. However, if no frames are free then a frame must be "deallocated" from the track to which it is currently assigned and reassigned to the new track which is to be staged. The best frame to deallocate is one which is no longer being read by the host. Frames which are still being read by the host should not be deallocated because overhead spent in staging the track would not be recovered if it were deallocated before the data is read. See the copending application entitled "Detection of Sequential Data Stream", referred to and incorporated by reference above for details of methods by which deallocation may be performed.

In a presently preferred embodiment of the invention, where no free frames are available frame assignment is performed using a "least recently used" (LRU) scheme. The LRU scheme is implemented by means of a list of frames, an example of which is shown in FIGS. 5a–5c. The list has a top, at which is located the frames which have been most recently used, and a bottom, which corresponds to the frames which have not been used recently and those which are free. Thus, when a frame is used, that is, is staged to or read from, its "name", i.e. its address and identifier, is placed atop the list. When a frame is deallocated, its name is moved to the bottom of the list. This occurs when the host directs a write operation to the area on disk from which the contents of that frame were staged, thus rendering the data in that frame invalid, or when all records have been read from that track. Thus, the bottom of the list contains a free frame or the least recently used frame, and the frame on the bottom of the list will typically be the best to assign to a track to be staged. Of course, when the frame is assigned, it is moved to the top of the list, indicating that it is the most recently used.

FIGS. 5a–5c depict the cache directory which is stored in the control store memory of cache manager 32. This directory contains the least recently used (LRU) list which is used to determine the domain and frame location addresses assigned to a given track. The cache directory contains a linked list of frame locations and the status of each. FIG. 5a shows a series of frame descriptors 74, each describing a frame in the array. Each frame descriptor contains the status of its corresponding frame. LRU (least recently used) pointers which maintain the linked lists are also shown. The frame descriptor 66 is the top of one LRU list, and stores addresses of the frames which have been most recently used; the descriptor 68 is at the bottom of the list, and lists frames which have not been used recently and those which are free. Descriptors 66 and 68 are for one type of disk drive (type A). Descriptors 70 and 72 are similar, but are used for another type of disk drive (type B).

FIG. 5b exemplifies the ten 2-byte words 63 which make up each of the frame descriptors. The first two words (addresses 00 and 01) are used in searching for a particular track of data which has been stored in cache. The words stored at address locations 02 and 03 are the LRU pointers, i.e., show where the corresponding frame is located on the LRU list. The pointer word at address 02 gives the address of the frame which is the next most active. The list has double pointers so the pointer at address 03 specifies the neighbor frame toward the top of the list. The words at addresses 04 and 05 are the track addresses of the frame described by the descriptor. Address 06, byte 0 stores the frame status byte which is described more fully with respect to FIG. 5c. The words stored at addresses 07 and 08 are the domain and cache addresses for the particular frame.

FIG. 5c shows in more detail the eight bits of the frame status byte, word 06, byte 0, of FIG. 5b. These bits are set to indicate the staging activity of the particular frame under consideration.

Bits 0-5 of the 8-bit frame status byte show specific flags indicative of various conditions relevant to the frame status. The six bits 0-5 are interpreted as follows:

Bit 0: Allocated/Free
   1 = The frame is allocated and contains valid data
   0 = The frame does not contain valid data Bit 1: Device A/B
   1 = This is a device type 'A' frame
   0 = This is a device type 'B' frame Bit 2: Defined Frame
   0 = This frame is undefined, that is, this slot for a frame in the directory does not define a frame.
   1 = This frame is defined Bit 3: Stage In Progress
   1 = There is a stage in progress to this frame. The data is not yet valid but the frame is not free.
   0 = There is not a stage in progress to this frame.

Bit 4: Permanent Error
   1 = This frame contains a permanent error. The data is not valid, but the frame is not to be reallocated.

The address of the error is stored where the track ID is normally stored.

0 = The frame does not contain a permanent error.

Bit 5: In Use

1 = This frame is currently in use. The device corresponding to this frame must not be selected.

0 = This frame is not in use.

Thus, for example, if bit 4 of the frame status word is a "1", this indicates that this frame contains a permanent error (e.g., if one of the RAM chips within which the frame is stored is defective). Obviously it would be undesirable to assign data to this frame for caching. Bits 1 and 2 are used in the reallocation process discussed below in connection with FIG. 4.

Thus, the cache manager contains a linked list of frame descriptors which specify the address and the status of each of a plurality of frames in the cache array 34. When writing to cache, in response to an input/output command, the domain address and the beginning of track address of an available frame are obtained from the linked list of FIG. 5a. As noted, this is referred to as an "LRU" list (least recently used) because the top of the list contains frames which have been most recently used and the bottom of the list contains frames which have not been used recently and are therefore available. In accordance with the invention of copending Ser. No. 440,334 filed Nov. 9, 1982, in the names of Swiatek et al, "Dynamic Addressing for Variable Track Length Cache Manager," incorporated herein by reference, the LRU list provides a beginning-of-track (BOT) address of a frame in a domain assigned to a particular type of magnetic disk device. The number of bytes in a track of data for this type of device is known, and it is added to the BOT address to obtain the end-of-track (EOT) address. In this manner, the EOT address is derived by the cache manager 24.

In writing a track to cache, the starting address is the first address after the BOT address which allows an adequate number of storage locations for the header. As a track is staged, or written, to the cache, the address location of each record is stored in the header.

When reading from the cache, the starting address is the address of the record specified, as determined from the header.

Even given the LRU scheme, for assignment of specific frame addresses in domains to tracks to be cached, it may well be that if two or more classes of domains of different sizes are present in the cache memory, a first type will be much more heavily used than a second type so that the LRU list for the first domain type will have, for example, fewer free frames on it than the list of the second domain type. In such cases, system performance can be improved by reallocating domains from the second type of storage to the first. This domain reallocation method allows for efficient use of cache space. Stated differently, since the need for frames suited to a particular device will vary with time, it is desirable to dynamically allocate and deallocate domains to device type based on demand. An important aspect of the present invention relates to a suitable dynamic domain allocation scheme; in a preferred embodiment, the invention supports two types of disk storage devices having differing track storage capacities and can reallocate domains from, e.g., device type A to device type B, although it would be possible to provide three or more classes of domains in a given cache. In this way the cache space is allocated in proportion to the input/output activity.

According to the presently preferred embodiment of the invention, three questions are considered by the domain allocation decision-making process:

How often to switch domains?

When to switch a domain?

Which domains to switch?

With respect to the first question, domain switching is considered in the presently preferred embodiment on the order of once every 1024 stage operations, i.e., every 1024 times a data track is read into the cache memory. In a relatively large embodiment of the invention this is expected to occur approximately every 30 to 60 seconds.

The second problem is determining when to switch a domain. This decision should be based on an imbalance between the cache input/output activity ratios for device types A with respect to device type B. A suitable method of measuring activity is to count the stages to domains assigned to each device type. This stage count ratio should be equal to the ideal "frames available" ratio. In turn, the frames available ratio can be used to compute an ideal "domains allocated" ratio since the number of frames per domain is known. If the actual domains allocated ratio is different from the ideal domains allocated ratio it is appropriate to switch domains. In this way, the relative size of the various frames is removed from the consideration, as opposed to merely measuring domain type activity.

The third and most difficult problem is to determine which domain to switch. Domains with many recently used frames are clearly not good candidates for switching. The best domains to switch are instead those that have many old and free frames. Two alternatives may be considered. First, since the LRU list described above in connection with FIGS. 5a–5c shows the relative age of the frames of each domain, the list can be used to determine which domain to switch. A scan of a predetermined number of frames on the list described above can be made, incrementing a counter for each domain when a frame belonging to the domain is found on the list. Accordingly, the domain having the lowest count at the end of the scan is that which is currently undergoing the least activity. The scan should be limited to the top portion of the list, because this is where activity occurs. It might seem that the lower end of the list could be most profitably looked at because this is where the old and invalid frames will congregate. However, if but a single active frame is in the same domain with a large number of old frames it would be invalidated as well by this kind of domain reallocation operation, which would be undesirable. The second alternative is to count the stages to each domain rather than to examine the least recently used frame list. This would again provide an indication of relative activity.

Thus, it will be clear that the domain switching scheme according to the invention has two portions: the decision-making portion, which decides whether or not it is desirable to switch domains from one class to another, and an actual switching process, in which it is determined which domain is to be switched. In a particularly preferred embodiment, the decision making process is table driven in order to save execution time; that is to say, when the device is turned on, a look-up table indicating the ideal allocations of the domains for varying relative activity levels is generated and stored so that each subsequent reallocation decision can then simply be a look-up process not requiring an elaborate computation. Such a domain switch decision table, usable in a preferred embodiment of the invention where the domain switching occurs between two device types, is shown in FIG. 3.

The table is built by making all the possible domain switching decisions at post-IMPL time (that is, upon initial microcode loading of the device) thus saving computation time when the decision is actually made. Making the decision to reallocate a domain thus becomes a simple table look-up based on, e.g., the number of domains allocated to device type A and "A domain use"—a number representing actual staging operations from devices of type A—at a particular time. In the embodiment of FIG. 3, the table shows numbers between zero and 15 (i.e., F, in hexadecimal) along the horizontal axis indicative of the relative number of stages to A device domains. While the vertical axis represents the number of domains allocated to A-type devices, each column thus represents the A-use figure, while each row represents the number of domains allocated to device A at a given time. For each row, that is, for each number of domains allocated to A-type devices, there is an ideal target A-use. The table thus provides a correlation between the number of A stages made in a given time and the number of domains allocated to A-type devices. If the actual figure is not equal to the ideal figure exemplified by the table of FIG. 3, then it is evident that domain switching should be performed.

Target use is calculated based on the assumption that the ideal cache partitioning is achieved when:

$$\frac{\text{frames } A}{\text{frames } B} = \frac{\text{stages } A}{\text{stages } B}$$

One can usefully define a term called "Target A Stages", this being the number of stages which would occur to domains assigned to device type A if the staging activity was in balance with cache allocation. This will lead to a target A frame use which can be compared with the actual A frame use to determine how close the actual stage activity compares with what will be ideal. Thus, in the table of FIG. 3, each of the horizontal rows represents a given number of domains allocated to a device. The target A-use is then identical for that row. One of three indications is then filled in for each position of that row according to actual use. A small a, indicating a B to A domain reallocation is "pending", i.e., desirable, is filled in at the places corresponding to actual A use being greater than target A use, thus indicating that switching of a frame from B to A is an acceptable action if a request for an A frame assignment cannot be satisfied based on current allocation. Similarly, a small b indicating a "pending" switch from A to B is filled in at the positions corresponding to A-use being less than target A-use. Otherwise an n, indicating a "no switching required" condition is filled in. Comparison of the actual use with the ideal relationship shown in FIG. 3 thus shows what reallocation should be performed, if any.

As will be observed from FIG. 3, several, typically 3, of the columns for each row have n's which indicate that no switch is pending. This is desirable in order to prevent unnecessary domain switching due to statistical variation in the number of stages per domain type over a short period of time which can be expected to occur, while not indicating that domain reallocation is called for. The plurality of n's in the columns thus provide a quasi-damping effect on the domain switching performed according to the invention.

Once it has been determined that a domain switch is pending, as above, if data is to be cached and no frame for the proper device type is free, and a domain switch operation is pending which would provide a frame of the proper device type, the domain switching operation is initiated.

The first operation performed in the domain switching operation is to decide which domain would be the best to switch. The least recently used list of FIGS. 5a-5c of the device type to be switched is scanned to determine which domain has the fewest frames on the more active portion of the least recently used list. If this domain in turn has no frames marked "In Use" or "Stage In Progress", it is presumed to be the best one to switch. Otherwise, the domain with the next fewest frames in the top of the least recently used list is chosen. Once a domain is chosen for switching, the domain is converted to the new device type. All valid frames belonging to the domain are deallocated. All frames in the domain are removed from the least recently used list of the device type from which the domain was switched. For example, if a type A domain is thus deallocated, all frames in the domain are removed from LRU descriptor 68. The number of new frames that will fit into the new domain are linked onto the bottom of the new device type's least recently used list. In the example, they are written to the descriptor 72. Finally, new pointers to the array are assigned for each frame according to the frame sze of the new device type. Thus, when the domain conversion routine is finished, the new frames are at the bottom of the new device type's least recently used frame list and are marked free.

Figure 4:
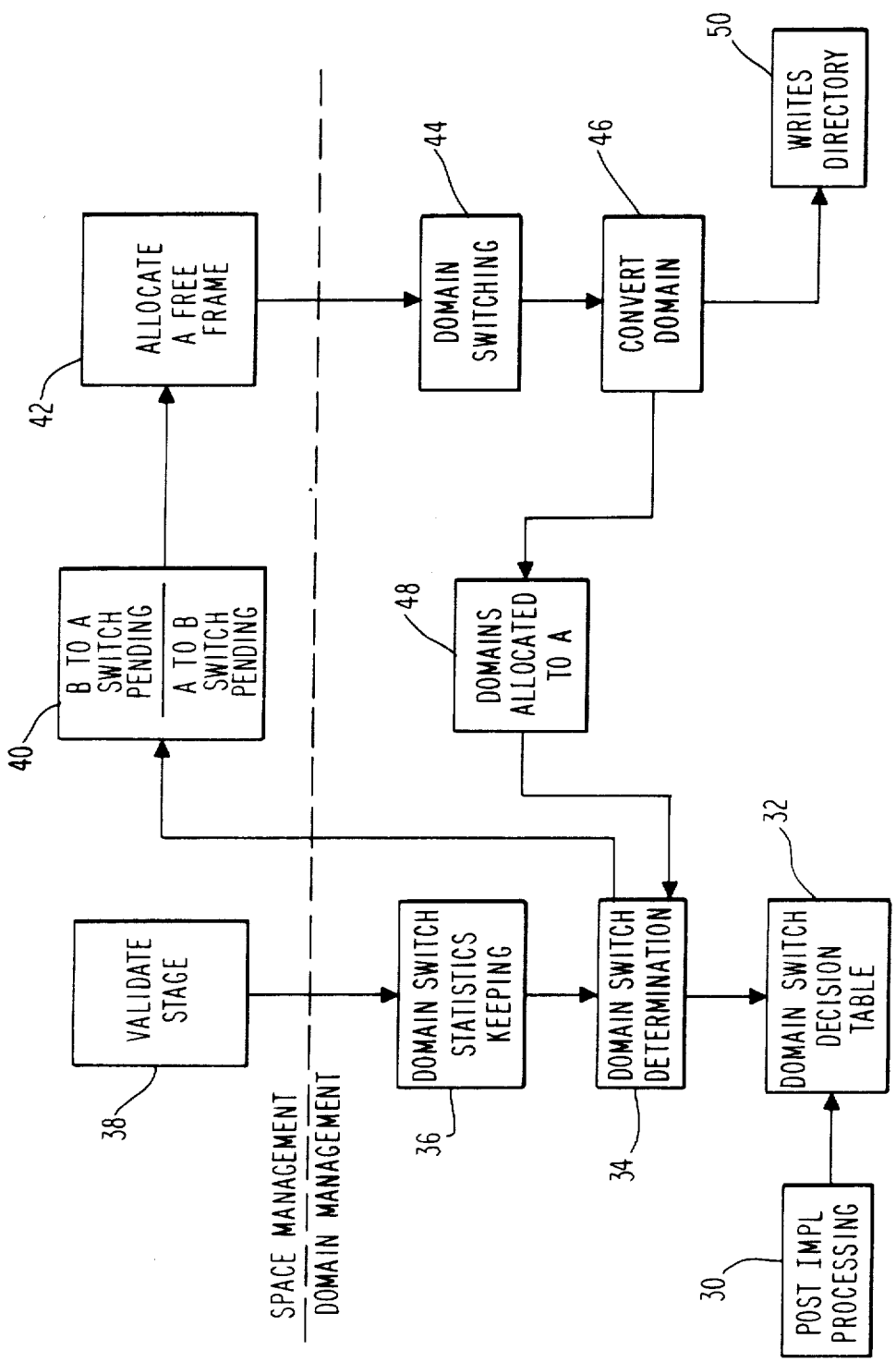
FIG. 4 shows a diagram indicating how the domain switching determination decision is utilized in actually performing the switching operation and how the control tables are updated as the scheme proceeds.

FIG. 4 shows a schematic view of the decision-making process according to the invention. As discussed above, at initial program load, "IMPL time", at 30, the table is written with all the possible decisions appearing as at 32, the table then appearing as in FIG. 3. This information is then available to domain switch determination module 34. This decision making process is also supplied with domain switch statistics as at 36 which indicate whether domain usage is presently corresponding to the domain allocation. Therefore, when a stage request is validated as at 38 by the cache controller 24, (FIG. 1) as discussed in copending application, Ser. No. 325,350 filed Nov. 27, 1981 for "Detection of Sequential Data Stream" and a continuation-in-part of that application, having the same title, Ser. No. 441,901 filed Nov. 15, 1982, the domain switch statistics may be examined to determine which domain, if any, should be switched. Typically, the operation is performed every 1024 stages. If an imbalance is detected by accessing the table of FIG. 3, as at 40, a flag is set indicating that a switch is pending. Thereafter, upon a request that a frame be allocated to a data record, if no free frame is available, and if an appropriate switch is pending, the least recently used domain is switched as described above as indicated at 44. The domain thus converted at 46 has now been allocated to the new device type, e.g., type A, and the LRU tables are updated to reflect this fact at 48, while the directory of frames available is likewise updated as at 50. Similarly, the frame status byte of each frame (FIG. 5c) are updated; bit 1, defining the device type to which the frame is assigned, would be switched, and bit 2 would be set to 1.

Attached hereto as Appendix A and incorporated herein by reference is a document entitled "Module:

Domain Switching" which is a detailed description of methods used to implement the invention. This document is largely written in a form of convenient shorthand language referred to as pseudocode, the grammar of which is explained in a document also attached hereto and incorporated by reference marked Appendix A-1, entitled "Chinook Prolog and Pseudo-Code Conventions." Those skilled in the art supplied with the domain switching document of Appendix A, together with the interpretative pseudocode convention document would have no difficulty implementing the methods of the invention.

Those skilled in the art will recognize that there has been described a domain partitioning system for dividing up a solid-state memory which fulfills the needs of the art and objects of the invention mentioned above. Specifically, use of domains having a size into which commonly accessed quantities of data, e.g., tracks, fit conveniently provides efficient storage of data without fragmentation as old records are overwritten by new data. More particularly, the provision of an adaptive domain switching scheme allows efficient utilization of memory to be achieved even when relative domain utilization changes from time to time. Furthermore, it will be appreciated that the metod of the invention has applicability beyond the two-device embodiment specifically described, and that therefore the description of the invention given above should not be considered as a limitation on its scope but only as exemplary thereof. The scope of the invention is more properly limited by the following claims.

APPENDIX A

EC 90039       MICROCODE ASSEMBLER 6.8   08/30/82   16:10:19     PN 5007037-01
PROGRAM: MDFGDSC1

DOMAIN SWITCHING

```
ADDR  INST                       STATEMENT                                      STMT #

*****************  START OF SPECIFICATIONS  *****************  002000    2
          *                                                              003000    3
          *                                                              004000    4
          *  MODULE NAME: MDFGDSC1                                       005000    5
          *                                                              006000    6
          *  MODULE TITLE: DOMAIN SWITCHING MODULE                       007000    7
          *                                                              008000    8
          *  FUNCTIONAL DESCRIPTION                                      009000    9
          *  ----------- -----------                                     010000   10
          *  The Domain Switching module is responsible for switching a  011000   11
          *  domain from one device type to another. The 'best' domain to 012000   12
          *  switch is determined according to the following criteria:   013000   13
          *                                                              014000   14
          *  1. The domain to be switched contains the least number      015000   15
          *     of frames that are 'active'. 'Active' means they are in the top  016000   16
          *     half of the LRU list.                                    017000   17
          *                                                              018000   18
          *  2. The domain to be switched may not contain a frame marked 019000   19
          *     'in use' or 'stage in progress'.                         020000   20
          *                                                              021000   21
          *  In certain situations, it may be impossible to switch domains 022000   22
          *  because criteria 2 above cannot be met. In this case an     023000   23
          *  indication is given that domain switching is not possible.  024000   24
          *                                                              025000   25
          *  Any valid frames in the domain being switched are first     026000   26
          *  deallocated. After the switch is complete, the frames will be free 027000   27
          *  and linked to the bottom of the LRU list for the new device type. 028000   28
          *  The frame size and pointers to the Array are adjusted properly for 029000   29
          *  the new device type.                                        030000   30
          *                                                              031000   31
          *  The following tasks are part of Domain Switching:           032000   32
          *                                                              033000   33
          *  - Calculate the 'best' domain to switch                     034000   34
          *  - Invalidate all frames in domain and remove from LRU list  035000   35
          *  - Convert domain and frames to new device type              036000   36
          *  - mark frames free                                          037000   37
          *  - link onto bottom of new device type LRU list              038000   38
          *                                                              039000   39
          *  The entry parameter to this module is a code indicating whether 040000   40
          *  to switch from device type A to B, or B to A. A return flag byte 041000   41
          *  is returned to indicate whether or not the switching was successful. 042000   42
          *                                                              043000   43
          *  OPERATIONAL DESCRIPTION                                     044000   44
          *  ----------- -----------                                     045000   45
          *  The first step in Domain Switching is to determine the best domain 046000   46
          *  to switch. An 'undesireability' count is established for each 047000   47
          *  domain by scanning the 'from' device type LRU list. The frames in 048000   48
          *  the first half of the list cause their corresponding domain's 049000   49
          *  undesireability count to be incremented by 10. The frames in the 050000   50
          *  lower half of the list cause the counter to be incremented by 1 051000   51
          *  if the frame is marked 'in use' or 'stage in progress', the 052000   52
          *  undesireability count is incremented by 2000. After the entire list
          *  has been scanned, the domain with the lowest non-zero undesireability 053000   53
          *  count is the 'best' domain to switch. (A count of zero means the 054000   54
          *  domain is allocated to the other device type.) If none of the 055000   55
          *  counts are below 2000, no domain can be switched, since they all 056000   56
          *  have a frame marked 'in use' or 'stage in progress'.        057000   57
          *                                                              058000   58
          *  The second step is to switch the domain determined in step one as 059000   59
          *  the 'best' one to switch. The frames are deallocated and taken off 060000   60
          *  the old device type LRU list. The domain is converted to the 061000   61
          *  proper number of new frames and they are linked onto the bottom 062000   62
          *  of the new device type LRU list. This second step is accomplished 063000   63
          *  by the Domain Reformatting segment.                         064000   64
          *                                                              065000   65
```

```
*   SPECIAL CONSIDERATIONS                                                          *   066000   66
*   -------- --------------                                                         *   067000   67
*   Integrity --  The domain being switched must not have any frames                *   068000   68
*                 marked 'frame in use' or 'stage in progress'.                     *   069000   69
*                                                                                   *   070000   70
*   Future --     If writes are allowed to the Cache, the best domain               *   071000   71
*                 to switch will take into account the number of frames             *   072000   72
*                 that need to be destaged.                                         *   073000   73
*                                                                                   *   074000   74
*   Future --     If a domain has a frame that is pinned, that domain               *   075000   75
*                 may not be switched.                                              *   076000   76
*                                                                                   *   077000   77
*   Timing --     If the decision process takes too long it may be                  *   078000   78
*                 better to just pick an arbitrary domain to switch                 *   079000   79
*                 or chose an alternate algorithm                                   *   080000   80
*                                                                                   *   081000   81
*   INTERNAL ITEMS   NAME       DESCRIPTION/PARAMETERS                              *   082000   82
*   -------- -----   ----       ----------------------                              *   083000   83
*   ENTRY POINT(S):  MDFGDSC1   ENTRY PARAMETERS    -   PASS REGISTERS              *   084000   84
*                               FLAG BYTE           -   XXXXXXXX                    *   085000   85
*                                    Bit 0=0 --> Switch from A to B                 *   086000   86
*                                    Bit 0=1 --> Switch from B to A                 *   087000   87
*                                                                                   *   088000   88
*   NORMAL EXIT(S):  caller     RETURN PARAMETERS   -   RETURN REGISTERS            *   089000   89
*                               RETURN FLAG         -   XXXXXXXX                    *   090000   90
*                                    Bit 0=0 --> Switch Occurred                    *   091000   91
*                                    Bit 0=1 --> No Switch Occurred                 *   092000   92
*   ERROR EXIT(S):   none       >                                                   *   093000   93
*   ROUTINES USED:   MDFGDSA7   Deallocate                                          *   094000   94
*                    MDFGDSS1   Reformat Domain Segment                             *   095000   95
*   MACROS USED:     >          >                                                   *   096000   96
*   DATA STRUCTURES: MDDGDT01   R/W    Directory (DIR)                              *   097000   97
*                    MDDGDT09   R/R    Space Status Table (SST)                     *   098000   98
*                    MDDGDT11   R/W    Directory Status Table (DRS)                 *   099000   99
*                                                                                   *   100000   100
*   INTERNAL REGS:   >          >(R/W)  >                                           *   101000   101
*   EXTERNAL REGS:   >          >(R/W)  >                                           *   102000   102
*                                                                                   *   103000   103
*   ENTRY IRG:       >          EXIT IRG:  >                                        *   104000   104
*                                                                                   *   105000   105
*                                                                                   *   106000   106
*   CHANGE ACTIVITY                                                                 *   107000   107
*   ------ --------                                                                 *   108000   108
*   01/09/81           START                                                        *   109000   109
*   02/10/81           D1 SCHEDULED (prolog)                                        *   110000   110
*   02/10/81           D1 COMPLETED                                                 *   111000   111
*   05/19/81           I1 SCHEDULED (pseudo code)                                   *   112000   112
*   05/19/81           I1 COMPLETED                                                 *   113000   113
*   06/27/82   RLC    TRACE POINT ADDED                                             *   114000   114
*   MM/DD/YY           I2 SCHEDULED (real code)                                     *   115000   115
*   MM/DD/YY           I2 COMPLETED (MODULE SIZE = ??? words)                       *   116000   116
*                                                                                   *   117000   117
**********************  END OF SPECIFICATIONS  **********************                   118000   118
                     START MDFGDSC1
                     ORG MDFGDSC1                                                       120000   120
            MDFGDSC1 USAVE                                                              121000   121
1780  2DF3  + MDFGDSC1 P3 = IRG                   *THIS IS A STUB                       122000   122
1781  27F1  +          IRG = IRG + X10             *SAVE IRG IN P3
                     UBTRACE TRC_7010              *INCREMENT PRIMARY GROUP             052000
1782  1D13  +          JH   MIC.BTRCBIT.TLAB0002                                        123000   123
1783  5FE4  +          DC   TRACEMOD              *IF TRACE OFF THEN SKIP               055000
1784  7010  +          DC   X7010                 *BAL INSTR TO TRACE ROUTINE           056000
                                                  *TRACE ID                            057000
            + TLAB0002                            *LABEL EQUATED TO NEXT LINE          058000
                     USETIRG IRG_SECD RTN_SECD                                          124000   124
1785  31F0  +          IRG  = IRG . XF0
1786  33F4  +          IRG  = IRG / X04            *Clear appropriate nibble            066000
1787  CA80  +          RETFLAG = SNOSWTCH          *Set appropriate nibble              067000
                     URESTORE                      *SET NO SWITCH PERFORMED             125000   125
1788  31F0  +          IRG  = IRG . XF0                                                 126000   126
1789  37F4  +          IRG  = IRG + X04            *ZERO SECONDRY REGISTER GRP         051000
178A  27FF  +          IRG  = IRG + XF0            *SET SECONDARY TO 4                 052000
                     URETURN                       *AND DECREMENT PRIMARY              053000
178B  4C54  +          BALR P4P5, P4P5                                                  127000   127
                                                   *RETURN TO CALLER                   048000
*   ENTRY Domain Switching                                                              128000   128
*                                                                                       129000   129
*   IF 'switch from B to A' code passed                                                 130000   130
*     THEN set from device type to 'B'                                                  131000   131
*     ELSE set from device type to 'A'                                                  132000   132
*                                                                                       133000   133
*   (Determine the 'best' domain to switch)                                             134000   134
*   Set upper-half-count to number of frames allocated for 'from' device                135000   135
*       type divided by 2 (right shift)                                                 136000   136
*   Find top of 'from' linked list                                         (DST)        137000   137
*   Zero undesireability counts                                                         138000   138
*                                                                                       139000   139
*   DO-WHILE not end of list                                                            140000   140
*     Find next entry on list                                                           141000   141
*     IF upper-half-count not zero                                                      142000   142
*       THEN-DO for upper half count not zero                                           143000   143
*         Increment undesireablity-count corresponding to frame by 10                   144000   144
*         Decrement upper-half-count by one                                             145000   145
*       END-THEN for upper half count not zero                                          146000   146
*     ELSE increment undesireablity-count corresponding to frame by 1                   147000   147
*     IF frame marked in use or stage in progress                                       148000   148
*       THEN increment proper undesireability-count by 2000                             149000   149
*   END-WHILE not end of list                                                           150000   150
*                                                                                       151000   151
*                                                                                       152000   152
                                                                                        153000   153
```

```
    • Set domain-number to 1                                              154000   154
    • Set minvalue to 2000                                                155000   155
    • Set domainid to 0                                                   156000   156
    •                                                                     157000   157
    • DO-WHILE domain-number not greater than number-of-domains           158000   158
    •   IF undesireability-count for this domain is less than minvalue    159000   159
    •     THEN-DO for undesireability-count is less than minvalue         160000   160
    •       Set domainid to domain-number                                 161000   161
    •       (domainid is the new 'best' domain to switch)                 162000   162
    •       Set minvalue to undesireability-count                         163000   163
    •       (minvalue is the new 'value' to beat to be the best domain to 164000   164
    •         switch)                                                     165000   165
    •     END-THEN for undesirability-count less than minvalue            166000   166
    •   Increment domain-number to point to next domain                   167000   167
    • END-WHILE domain-number not greater than number of domains          168000   168
    •                                                                     169000   169
    • (The domain identified by domainid is the best domain to switch.    170000   170
    •   if it contains 0, then no domain was suitable to switch)          171000   171
    •                                                                     172000   172
    • IF domainid not zero (a domain is suitable to switch)               173000   173
    •   THEN-DO for domainid not zero                                     174000   174
    •     INCLUDE Convert Domain                                          175000   175
    •     Subtract 'from' frames per domain from 'from' number of frames  176000   176
    •       allocated (DST)                                               177000   177
    •     Add 'to' frames per domain to 'to' number of frames allocated(DST) 178000 178
    •     Increment 'to' number of domains allocated by 1 (DST)           179000   179
    •     Decrement 'from' number of domains allocated by 1 (DST)         180000   180
    •     Set domain switched return flag                                 181000   181
    •   END-THEN for domainid not zero                                    182000   182
    •   ELSE set no switch return flag                                    183000   183
    •                                                                     184000   184
    • RETURN                                                              185000   185
          END                                                             186000   186
```

APPENDIX A-1

OMRB14
CHINOOK PROLOG AND PSEUDO-CODE CONVENTIONS

FROM: RON BLICKENSTAFF
      BRIAN TREDE

CC: CHINOOK Group

DATE: 11/14/80    LATEST REVISION: 08/12/82

This design memo attempts to document the conventions used by the Chinook microcode group in the development of the microcode for the Cache buffer subsystem. The description of these conventions is divided into two parts: the prolog and the pseudo code.

Figure 1 shows the prolog skeleton used when creating a new microcode module. The engineer fills in each section as he or she designs the module. After the module is designed, it is reviewed via the design review process. This is the 'D1' step. The pseudo code is then written and is also reviewed via the design review process. This is the 'I1' step. After the pseudo code has been reviewed and approved, then the actual microcode is written. The pseudo code is blocked off as comment lines and the microcode for each block of pseudo code is placed directly underneath the pseudo code block. The microcode is then reviewed and/or simulated. This is the 'I2' step. By following this method of design and implementation, the resultant module is self documenting. All the steps of the design are documented in the finished listing for that module.

```
&MOD3     TITLE '>B'
******************* START OF SPECIFICATIONS *********************
*                                                               *
*   MODULE NAME:  >A                                            *
*                                                               *
*   MODULE TITLE: >B                                            *
*                                                               *
*   MODULE OWNER: >                                             *
*                                                               *
*   FUNCTIONAL DESCRIPTION                                      *
*   ----------  -----------                                     *
*   >(WHAT the module does - include all functions provided. Be sure *
*      to include a high level description of the parameters passed *
*      into and out of the module.)                             *
```

```
*   OPERATIONAL DESCRIPTION
*   ----------- -----------
*   >(HOW the module does it - this is an overview)
*
*   SPECIAL CONSIDERATIONS
*   ------- --------------
*   >(such as timings, configuration, device types, integrity,
*     initialization requirements, execution level)
*
*   INTERNAL ITEMS    NAME        DESCRIPTION/PARAMETERS
*   -------- -----    ----        ----------------------
*   ENTRY POINT(S):   >A          >
*   NORMAL EXIT(S):   >           >
*   ERROR EXIT(S):    >           >
*   ROUTINES USED:    >           >
*   MACROS USED:      >           >
*   DATA STRUCTURES:  >           >(R/W)   >
*   INTERNAL REGS:    >           >(R/W)   >
*   EXTERNAL REGS:    >           >(R/W)   >
*
*   ENTRY IRG:        >           EXIT IRG:  >
*
*   CHANGE ACTIVITY
*   ------ --------
*   MM/DD/YY          START
*   MM/DD/YY          D1 SCHEDULED (prolog)
*   MM/DD/YY          D1 COMPLETED
*   MM/DD/YY          I1 SCHEDULED (pseudo code)
*   MM/DD/YY          I1 COMPLETED
*   MM/DD/YY          I2 SCHEDULED (real code)
*   MM/DD/YY          I2 COMPLETED (MODULE SIZE = ??? words)
*   >(m/d/y)  >(by) >(change #) >(change description)
*
********************** END OF SPECIFICATIONS **********************
```

Chinook Prolog Skeleton
FIGURE 1

PROLOG CONVENTIONS
------ -----------

The following discussion describes the usage of each of the sections in the prolog skeleton.

1) &MOD3    TITLE '>B'
   This line performs two functions: The &MOD3 is ignored by the assembler but is used by the Chinook script control file when the module is imbedded into the Chinook design specification. The TITLE is used by the assembler to assign a title to each page of the listing output for this module. The capital 'B's (and 'A's) are for convenience when filling in the skeleton.

2) MODULE NAME is the 1 to 8 character name assigned to this module and is usually the same as the label used by other modules to call this module.

3) MODULE TITLE is the actual title of the module that describes what the module is for.

4) MODULE OWNER is the name or initials of the engineer responsible for the design and implementation of this module. The module owner information is deleted when the microcode is finally released.

5) FUNCTIONAL DESCRIPTION is an english description of WHAT the module does. This includes a description of all the major functions provided to the caller. Avoid providing details of how the functions are accomplished (see the next section). Also included in this section in a final paragraph is a high level description of the parameters that are directly passed to and returned from this module. Avoid confusing the more global concepts of input and output with the more specific concepts of parameter passage here. An example of this is as follows: A module is created that outputs a line of text to a video display tube. An input parameter might be the text itself or a pointer to a message stored in a table. The output of the module is the line of text displayed on the video tube. However there may not be any parameters returned to the caller. In this case, the paragraph would state that there are no parameters passed back to the caller. The preceeding paragraphs would state that the function of this module is to display a specified line of text to a video display tube.

6) OPERATIONAL DESCRIPTION is a description of HOW the module accomplishes its function(s). The Operational Description should give the reader an overview of the basic flow (or structure) of the module. The tendency to avoid here is that of getting so specific that this section becomes a prose duplication of the pseudo code to follow. The basic concept to be kept in mind is that the level of detail generally increases as the progression is made from Operational Description to pseudo code to microcode.

7) SPECIAL CONSIDERATIONS is a section that describes constraints, requirements, or subtle pieces of information that affect the design or the execution of this module.

8) ENTRY POINT(S): this section contains a list of the label names of all the entry points to the module and the corresponding descriptions of the specific input parameters for each entry. These descriptions go down to the bit level if necessary and also tell the user of the module how the parameters are passed (via a pass table or specific internal registers, for example).

9) NORMAL EXIT(S): this section contains a list of the label names of the exits from this module that are not error exits. Hopefully there will only be a single exit from most modules, and that will be a return to the caller. If the normal exit is a return to the caller, then the word 'caller' is placed in the name column for this entry. A description of the output (return) parameters for each exit is included and contains the same level of detail as that used for the input parameters described above.

10) ERROR EXIT(S): this section contains a list of the error exits and a one line description of the error for each exit. If parameters are passed, these are then described underneath the error description.

11) ROUTINES USED: this section is a list of the names of all the routines that are called by this module. The titles of each of the used routines are also included. Input and output parameters are not included here since they are described in the prolog of the called routine.

12) DATA STRUCTURES: is a list of all the tables or other data structures that are utilized by this module. The title of each data structure is also included. In addition, it is helpful to put a 3 or 4 character abbreviation of the table title in parenthesis at the end of the title. This abbreviation can then be used in the pseudo code for variable definition (see the Variables section of Pseudo-code Conventions).

13) INTERNAL REGS: this section is specific to the current microprocessor design and describes the internal registers of the current primary group that are affected by this module. If the module increments the IRG and does not affect the current group, then this section should state 'current group not affected'.

14) EXTERNAL REGS: this section describes the usage of the external registers by this module. The description (or title) of each external register used is listed under the description column.

15) ENTRY and EXIT IRG: this section defines what the expected value of the IRG (Internal Register Group) is when this module is called and what the value will be when this module is exited.

16) CHANGE ACTIVITY is a section that documents the progress of the module as it passes through the design, implementation, and debug phases. The tendency is to not fill this section in. However, if filled in, this section can provide useful information for the project manager when the next project is planned. The final item under Change Activity is meant to be used whenever a change is made to the module after it has entered system test. This is a useful way of charting the changes to a module that have occurred after the initial design process has been completed.

A final note on the time at which each of these sections should be filled out: All sections through Special Considerations should be filled out prior to the 'D1' review. The Routines Used and the Data Structures sections should be filled out prior to the 'I1' review. The Change Activity section should obviously be filled in as the appropriate milestones or changes are made. The remaining sections should be filled in when the actual microcode is written.

PSEUDO-CODE CONVENTIONS

The writing of pseudo code is a difficult art to develop. The pseudo code is meant to be a bridge between the prolog's operational description and the microcode itself. There seems to be either the tendency to make the pseudo code too general or too specific and detailed. If it is too general, then it becomes a duplication of the operational description and does not contain enough detail for the 'I1' reviewers to satisfactorily check out the design. If it is too specific, then it becomes a duplication of the microcode and contains so much detail that the reader becomes bogged down and looks instead at the actual microcode. The trick is to maintain a happy medium between these two extremes.

The pseudo code language used for the CHINOOK project consists of the following pseudo code control keywords. The purpose of the keywords is twofold: First, consistancy between microcoders is achieved. It is much easier to understand another persons code if it looks similar to your own code. Second, the module becomes much more structured by using standard conventions for decisions, loops, and linkage.

A final phillisophical note: if the microcode does not follow the pseudo code as closely as possible, or if the microcode is changed during the debug phase of the project but the pseudo code is not updated, then it becomes less than worthless and can actually contribute to confusion and errors in understanding.

The pseudo code conventions are:

1) All pseudo code keywords must be capitalized. When two keywords appear together (END-THEN), they will be hyphenated.

2) Pseudo code begins in column three and each level of nesting is indented two spaces.

3) The use of Set and Initialize words in comments and pseudo code is often ambiguous. While the usage of Reset is generally accepted as meaning 'put it to the inactive (or zero) state', the usage of Set or Initialize often means one thing to the author while the reader may interpret them differently. By being a little more explicit, this confusion could be eliminated. Such as:

Not -- Set the 'Cache Mode' flag
       But -- Set the 'Cache Mode' flag on
   Not -- Initialize the Status Table
       But -- Initialize the Status Table to zeros (x00)
   Not -- Initialize the print buffer
       But -- Initialize the print buffer to blanks (x40)

4) All variables are either

A) enclosed by single quotes, such as 'temp return code' (this allows for single word variables), or B) hyphenated and the first letter of each word is capitalized, such as Temp-Return-Code.

Flags follow either format but also include the word flag or the word bit following the variable name, such as 'streaming active' flag or Streaming-Active-Bit.

Note: Either convention for variable naming is acceptable. However, be consistent within all of your modules.

Variable names are further modified by specifying where they are coming from the first time they are used in a module. For example:

Tag-Code (local)  = a locally defined variable
   Tag-Code (L)      = a locally defined variable
   Tag-Code (input)  = a variable passed to this module
   Tag-Code (I)      = a variable passed to this module
   Tag-Code (output) = a variable passed from this module
   Tag-Code (O)      = a variable passed from this module
   Tag-Code (CST)    = a global variable that resides in the
                       table with the corresponding abbrevia-
                       tion in the Data Structures section of
                       the prolog Listed below are the pseudo keywords, followed by examples of their use. One of the primary benefits of pseudo code is to separate code into small cohesive units. Thus, the pseudo language is designed to block code by using 'DO' 'END' groups.

DECISIONS

Keywords:

IF
THEN (NULL)
ELSE (NULL)
THEN-DO
END-THEN
ELSE-DO
END-ELSE

All decisions must begin with the 'IF' keyword. The next part of the pseudo code depends on what action is performed.

If for example, the positive leg of the test consists of only one pseudo instruction the 'THEN' form of the code is used. If the leg consists of two or more pseudo instructions the 'THEN-DO', 'END-THEN' form is used.

The NULL keyword is used for pseudo code completeness, but does not result in real code other than possibly a branch. If a test is made on one condition but the action is performed on the other, the THEN leg becomes null and the THEN NULL statement must be used. If the ELSE leg is null, the ELSE NULL statement is optional. The NULL is not part of the THEN or ELSE keyword, but is the action performed. Thus, it is not hyphenated.

Examples:

```
IF the enable/disable switch is disabled
  THEN set the 'disable' flag on

IF the enable/disable switch is disabled
  THEN-DO for disabled
    Set the 'disable' flag on
    Setup to notify the cache director
  END-THEN for disabled IF the enable/disable switch is disabled
  THEN set the 'disable' flag on
  ELSE set the 'enable' flag on IF the enable/disable switch is disabled
  THEN-DO for disabled
    Set the 'disable' flag on
    Setup to notify the cache director
  END-THEN for disabled
  ELSE-DO for enabled
    Set the 'enable' flag on
    Setup to continue
  END-ELSE for enabled IF the 'deselection reset' or 'check 1 reset' flags are on and
   the 'table update in progress' and 'reset pending' flags are off
  THEN NULL for deselection reset
  ELSE-DO for general reset
    Reset the 'deselection reset' flag
    Reset the 'check 1 reset' flag
  END-ELSE for general reset
```

LOOPS

Keywords:

DO-WHILE
END-WHILE

DO-UNTIL
END-UNTIL

WAIT

HALT

Loops are coded in several ways. Either the check for the exit from the loop is done at the beginning of the loop or at the end. If it is done at the end, then the loop will always be executed at least once. The DO-WHILE has the check in the beginning while the DO-UNTIL checks at the end.

A third type of loop is a one word loop which spins on a condition, waiting for the condition to come or go away. These are coded using the WAIT keyword.

A fourth type of loop is a one word loop which is used during the debug phase of a product. It is used to detect internal logic problems that should not occur and are normally not even coded because it would be to expensive. To attempt to find these problems during the testing phase, the HALT keyword is used. The HALT statements result in execution of a macro which does a one word loop during the test phase. When the product is shipped, the macro can be changed to a NOP or to a generalized recovery routine.

Examples:

```
DO-WHILE there are valid entries in the directory
   Save the device type in the LRU table
   Save the time stamp in the LRU table
END-WHILE there are valid entries in the directory DO-UNTIL there are no valid entries in the directory
   Save the device type in the LRU table
   Save the time stamp in the LRU table
END-UNTIL there are no valid entries in the directory WAIT for tag valid to rise HALT because the Cache Directory indicates 'Stage in Progress'
```

ROUTING

Keywords:

SELECT
WHEN
DO-WHEN
END-WHEN
OTHERWISE (NULL)
DO-OTHERWISE
END-OTHERWISE
END-SELECT

The case form of this pseudo code uses the SELECT, WHEN, OTHERWISE, keywords. It is used to select only one option when there are many to choose from. The WHEN keyword is used to select the options you need to process, while the OTHERWISE keyword is used at the end of the select structure to catch the remaining or invalid options. In any SELECT structure the OTHERWISE keyword must be used. If no action is to be taken in the OTHERWISE, then the OTHERWISE NULL statement must be used.

If there are only two options then a simple IF,THEN, ELSE, structure would suffice. If there is more than one option possible then the IF, THEN with a null ELSE structure would be used.

Example:

```
SELECT on tag
   DO-WHEN a poll command - tag 02
     CALL Poll module
       PASS: tag, command
       RECEIVE: Bus-In-Value
     Set response in bus-in
     Send response
   END-WHEN for poll command - tag 02
   .
   .
   WHEN read or write command - tags OE or OF
     CALL the Space Management module
       PASS: Tag-Value, Command-Value, Data-Length, Parms-Byte
       RECEIVE: Return-Code, Status-Byte, Data-Received
   WHEN read or write diagnostic command - tag OC or OD
     CALL the Diagnostic Management module
       PASS: Tag-Value, Command-Value, Data-Length, Parms-Byte
       RECEIVE: Return-Code, Status-Byte, Data-Received
   OTHERWISE for an invalid tag
     Set Return-Code (output) for an invalid tag
END-SELECT on tag
```

LINKAGE

Keywords:

ENTRY
CALL
  PASS:
  RECEIVE:
TRANSFER
  (PARM LIST:)
INCLUDE
RETURN

These keywords are used to block a module, or pass control
to another module. The PASS and RECEIVE fields on the CALL
keyword are designed to force narrow interfaces. You should
always be able to state exactly what parameters are
exchanged.

The CALL keyword is used when a module or subroutine is
being invoked and return is expected. If a return is not
expected, then the TRANSFER keyword is used. TRANSFER should
only be used in special situations such as Reset,
TRANSFERring control back to the Idle Loop, or error exits
to a central error recovery handler. The PARM LIST keyword
is optional and is used when parameters are passed during a
TRANSFER.

The INCLUDE keyword is used to include a segment of code
inline into the module. Segments are created to package a
module into small logically cohesive units. They are used
instead of subroutines because they are invoked in only one
place. Because of addressing and assembler restrictions,
segments in the CHINOOK system are implemented using the
BALR instruction.

Example:

```
ENTRY Space Manager
SELECT by command
  DO-WHEN a directory search
    Set DID-CC-H for search routine
    CALL Search Routine to see if entry is in the Cache
      PASS: DID-CC-H
      RECEIVE: 'found' flag
    IF DID-CC-H was found
      THEN set 'found' flag
      ELSE TRANSFER to the Reset Manager
    Save the DID-CC-H in the device table
  END-WHEN for directory search
  WHEN a read frame id
    INCLUDE the read frame id segment
END-SELECT by command
RETURN to caller
```

When parameters to be passed to a module are not to be
referenced anymore after they are passed, the CALL statement
may be stated in either of two ways:

Set Tag-Bus for a write tag
Set Bus-Out for a directory search command and residual count
CALL Send Tag module (MX123) to send the tag
  PASS: Tag-Bus, Bus-Out
  RECEIVE: Bus-In-Value or CALL Send Tag module (MX123) to send a directory search command
  PASS: tag bus, bus-out
  RECEIVE: Bus-In-Value In addition, when a parameter received from a called module
is not used, the CALL statement may be stated as follows:

```
CALL Send Tag module (MX123) to send a directory search command
   PASS:  tag bus, bus-out
   RECEIVE:  Bus-In-Value (not used)

Do not specify 'nothing' as received from the called module,
as this will lead to confusion as to whether or not the
module  designer   is  aware   of   the   proper  pass/return
parameters for the called module.
```

We claim:

1. In a method of dividing a memory array into domains for the storage of data received in plural differing predetermined amounts from plural classes of storage devices, the improvement which comprises:

effectively subdividing said array into domains of sizes which are each substantially integral multiples of said predetermined amounts of data stored therein by assigning starting addresses to said domains.

2. The improvement of claim 1 wherein said domains are allocated to one class of device at an initialization stage.

3. The improvement of claim 2 wherein the allocation of said domains may be varied from device class to device class over time, said variation being controlled in accordance with the ratio of the number of domains allocated to a particular device type to usage of said domains, and being accomplished by subdividing domains to be reallocated into areas of size equal to one of said predetermined amounts of data.

4. The improvement of claim 1 wherein said predetermined amounts of data are equivalent to complete tracks of data stored on magnetic disk storage media.

5. A method of organizing an array of memory locations to be used to store data records of plural differing predetermined lengths comprising the steps of:

determining a domain size which is substantially an integral multiple of all said plural predetermined data amounts;

effectively dividing said array into domains of the thus determined domain size by assigning starting addresses in said array to each domain; and allocating each of said domains to storage of records of a single one of said predetermined data amounts.

6. The method of claim 5 wherein said allocation may be varied in accordance with usage of each of said domains.

7. A caching memory subsystem for attachment to a host computer and magnetic disk devices of differing classes, in which various predetermined amounts of data are stored on the tracks of the disk of each class of disk devices comprising:

a solid-state cache memory array and a cache manager, wherein said solid-state cache memory array is effectively divided into plural domains by assignment of starting addresses in said array to each domain, said domains being so sized as to contain substantially integral multiples of said predetermined amounts of data;

said cache manager comprising means for copying data stored on magnetic disk storage devices into said solid-state cache memory array; and wherein said cache manager has means to divide each of said domains into frames sized to contain an amount of data equal to one of said predetermined amounts of data, and means to assign the address of a frame of corresponding size to data to be copied from one of said disk tracks to said solid-state caching memory array.

8. The caching memory subsystem of claim 7 wherein said cache manager further comprises means for reassignment of particular ones of said domains from one class of disk device to a second class upon indication that a usage imbalance exists, and to thereupon redivide said reassigned domains into frames sized to store amounts of data corresponding to the predetermined amount of data stored on one track of said disk device of the second class.

* * * * *